(12) United States Patent
Jo et al.

(10) Patent No.: US 12,126,493 B2
(45) Date of Patent: Oct. 22, 2024

(54) NETWORK MANAGEMENT APPARATUS, NETWORK MANAGEMENT METHOD AND NETWORK MANAGEMENT SYSTEM

(71) Applicant: RAKUTEN MOBILE, INC., Tokyo (JP)

(72) Inventors: Hiroyuki Jo, Tokyo (JP); Rion Kimura, Tokyo (JP); Tomomi Kanai, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/789,031

(22) PCT Filed: Sep. 2, 2021

(86) PCT No.: PCT/JP2021/032251
§ 371 (c)(1),
(2) Date: Jun. 24, 2022

(87) PCT Pub. No.: WO2023/032115
PCT Pub. Date: Sep. 3, 2023

(65) Prior Publication Data
US 2024/0179060 A1 May 30, 2024

(51) Int. Cl.
*H04L 41/08* (2022.01)

(52) U.S. Cl.
CPC ...... *H04L 41/0886* (2013.01); *H04L 41/0883* (2013.01)

(58) Field of Classification Search
CPC . H04L 41/0886; H04L 41/0883; H04L 41/40; H04L 41/0816; H04L 41/145; H04L 41/0863; H04L 41/0856; H04L 41/0843; H04L 41/0627; H04L 41/0895; H04L 41/046; H04L 41/0806; H04L 41/0213
See application file for complete search history.

(56) References Cited

U.S. PATENT DOCUMENTS 6,184,880 B1 * 2/2001 Okada ................. G06F 11/3688
714/E11.217
6,295,518 B1 * 9/2001 McLain ................. H04L 43/50
709/227

(Continued)

FOREIGN PATENT DOCUMENTS

WO 2016/121802 A1 8/2016

*Primary Examiner* — Alina A Boutah
(74) *Attorney, Agent, or Firm* — Sughrue Mion, PLLC

(57) ABSTRACT

Disclosed herein is a network management apparatus, comprising: a script acquisition unit configured to acquire a script for automating an operation related to operating a network; a parameter acquisition unit configured to acquire an input parameter that is required to run the script acquired by the script acquisition unit in a production environment of the script and a run mode in the production environment; and a script running unit configured to run the script acquired by the script acquisition unit according to the run mode acquired by the parameter acquisition unit using the input parameter acquired by the parameter acquisition unit, and, when the run mode is a dry run mode, the script running unit skipping a process of changing configuration of the network among processes described in the script, and running the script in the production environment.

9 Claims, 11 Drawing Sheets

(56) References Cited

U.S. PATENT DOCUMENTS

| | | | | |
|---|---|---|---|---|
| 6,832,184 | B1* | 12/2004 | Bleier, Jr. | H04L 43/50 |
| | | | | 702/182 |
| 10,656,983 | B2* | 5/2020 | Shelke | G06F 11/07 |
| 11,636,016 | B2* | 4/2023 | Roll | G06F 30/20 |
| | | | | 714/25 |
| 11,894,976 | B1* | 2/2024 | Kaluza | H04L 41/0813 |
| 2006/0031054 | A1* | 2/2006 | Nace | G06F 11/3419 |
| | | | | 703/13 |
| 2016/0373944 | A1* | 12/2016 | Jain | H04M 3/2236 |
| 2018/0024852 | A1 | 1/2018 | Yabushita et al. | |
| 2019/0026175 | A1* | 1/2019 | Shelke | G06F 11/0775 |
| 2019/0044823 | A1* | 2/2019 | Soundararajan | H04L 43/50 |
| 2019/0132212 | A1* | 5/2019 | Freund | H04L 41/0866 |
| 2020/0259712 | A1* | 8/2020 | Jonnalagadda | H04L 41/40 |
| 2022/0012149 | A1* | 1/2022 | Doshi | G06F 8/65 |
| 2022/0329483 | A1* | 10/2022 | Wang | H04L 41/0895 |
| 2022/0405180 | A1* | 12/2022 | Roll | G06F 11/261 |

* cited by examiner

FIG. 8

| STEP | PROCESS | DRY RUN |
|---|---|---|
| a | LOGIN SERVER HAVING TO-BE-REGISTERED IP ADDRESS AND CHECK DOMAIN SETTING | ✓ |
| b | PERFORM FORWARD/REVERSE DNS LOOKUP AND CHECK DNS REGISTRATION STATUS | ✓ |
| c | PERFORM DNS REGISTRATION | |
| d | PERFORM FORWARD/REVERSE DNS LOOKUP AND CHECK DNS REGISTRATION STATUS | ✓ |

```
                 ⎧ login (target_ip)
                 ⎪ domain = get_domain()
              a ⎨ IF domain != target_domain; THEN
                 ⎪     Error( "target server doesn't have target domain" )
                 ⎪ logout()
                 ⎩ ENDIF ⎧ current_ip = dns_lookup (target_domain)
                 ⎪ IF current_ip is not empty; THEN
                 ⎪     Error( "target domain is already registered in DNS" )
                 ⎪ ENDIF
              b ⎨
                 ⎪ current_domain = dns_reverse_lookup (target_ip)
                 ⎪ IF current_domain is not empty; THEN
                 ⎪     Error( "target ip is already registered in DNS" )
                 ⎩ ENDIF ⎧ IF mode is not dryrun; THEN
              c ⎨     register_dns(target_domain, target_ip)
                 ⎩ ENDIF ⎧ registered_ip = dns_lookup (target_domain)
                 ⎪ IF registered_ip is not target_ip; THEN
                 ⎪     Error( "failed to register DNS record" )
                 ⎪ ENDIF
              d ⎨
                 ⎪ registered_domain = dns_reverse_lookup (target_ip)
                 ⎪ IF registered_domain is not target_domain; THEN
                 ⎪     Error( "failed to register DNS record" )
                 ⎩ ENDIF
```

| STEP | PROCESS | DRY RUN |
|------|---------|---------|
| A | CHECK TARGET VM EXISTENCE AND DETAILED INFORMATION | ✓ |
| B | DELETE TARGET VM | |
| C | CHECK UNUSED RESOURCES IN DESTINATION PHYSICAL SERVER GROUP | ✓ |
| D | REGENERATE TARGET VM | |
| E | CHECK TARGET VM EXISTENCE AND DETAILED INFORMATION | ✓ |

421

NETWORK MANAGEMENT APPARATUS, NETWORK MANAGEMENT METHOD AND NETWORK MANAGEMENT SYSTEM

CROSS REFERENCE TO RELATED APPLICATIONS

This application is a National Stage of International Application No. PCT/JP2021/032251 filed Sep. 2, 2021.

TECHNICAL FIELD

The present invention relates to a network management apparatus, a network management method, and a network management system, and in particular to a technique for automating operations related to operating a mobile network.

BACKGROUND ART

With a background of improved performance of general-purpose servers and network infrastructures, cloud computing (hereinafter simply referred to as "cloud"), which on demand uses computing resources that are virtualized on physical resources such as servers, has become widely prevailing. In addition, the Network Function Virtualization (NFV), which virtualizes network functions and provides the virtualized network functions on the cloud, has been well known. The NFV is a technology that uses virtualization and cloud technologies to separate the hardware and software of various network services, which used to run on dedicated hardware, and to run the software on a virtualized infrastructure. It is expected to improve the sophistication of operations and reduce costs by use of those virtualization technologies.

In recent years, the virtualization has been advanced in mobile networks as well.

The European Telecommunications Standards Institute (ETSI) NFV defines the NFV architecture (see, for example, Patent Literature 1).

LISTING OF REFERENCES

Patent Literature

PATENT LITERATURE 1: International Publication of PCT International Patent Application No. WO2016/121802 A

SUMMARY OF THE INVENTION

Problems to be Solved by the Invention

Telecom networks are large-scale networks constituted with a large number of devices. In operating such large-scale networks, operations are required to be automated.

Automation of operations in operating a network is achievable by use of automation scripts that describe procedures for operating the network. Automation scripts are thoroughly tested in a staging environment, which is similar to an actual production environment, before being released to the production environment. However, the staging environment and the production environment are not exactly the same, thus, in the production environment, it is required to replace some of parameters in an automation script with parameters for the production environment.

The above parameters are input by an operator when running an automation script. Therefore, operations performed by automation scripts are likely to fail due to human errors. Resultantly, such operational failures may lead to failures of a network.

The present invention has been made in order to solve the above mentioned problems and an object thereof is to provide a network management apparatus, a network management method, and a network management system capable of preventing failures caused by failing in automated operations from occurring in operating a large-scale network.

Solution to Problems

In order to solve the above mentioned problems, according to one aspect of the present invention, there is provided a network management apparatus, comprising: a script acquisition unit configured to acquire a script for automating an operation related to operating a network; a parameter acquisition unit configured to acquire an input parameter that is required to run the script acquired by the script acquisition unit in a production environment of the script and a run mode in the production environment; and a script running unit configured to run the script acquired by the script acquisition unit according to the run mode acquired by the parameter acquisition unit using the input parameter acquired by the parameter acquisition unit, and, when the run mode is a dry run mode, the script running unit skipping a process of changing configuration of the network among processes described in the script, and running the script in the production environment.

The network management apparatus may further comprise: a normality verification unit configured to verity normality of the input parameter acquired by the parameter acquisition unit based on a result of running the script run in the dry run mode by the script running unit.

When the input parameter is verified to be normal by the normality verification unit, the script running unit may run, in the production environment, the script acquired by the script acquisition unit in a production run mode that runs the script acquired by the script acquisition unit including a process of changing configuration of the network described in the script.

When the input parameter is verified to be normal by the normality verification unit and the script is to be run in the production run mode in the production environment, the script running unit may run all processes described in the script without skipping a process that has been run in the dry run mode among processes described in the script.

When the input parameter is verified to be normal by the normality verification unit and the script is to be run in the production run mode in the production environment, the script running unit may skip a predetermined process that has been run in the dry run mode among processes described in the script to run the script.

When the run mode is the dry run mode, the script running unit may skip a process of registering a domain name and an IP (Internet Protocol) address in a DNS (Domain Name System) server among processes described in the script.

When the run mode is the dry run mode, the script running unit may skip a process of at least one of deleting and creating a virtual machine constituting a virtualized environment of the network among processes described in the script.

According to another aspect of the present invention, there is provided a network management method performed by a network management apparatus, comprising steps of: acquiring a script for automating an operation related to operating a network; acquiring an input parameter that is required to run the script in a production environment of the script and a run mode in the production environment; and running the script according to the run mode using the input parameter, and, when the run mode is a dry run mode, a process of changing configuration of the network being skipped among processes described in the script, and the script being run in the production environment.

According to yet another aspect of the present invention, there is provided a network management system, comprising: a script acquisition unit configured to acquire a script for automating an operation related to operating a network; a parameter acquisition unit configured to acquire an input parameter that is required to run the script acquired by the script acquisition unit in a production environment of the script and a run mode in the production environment; and a script running unit configured to run the script acquired by the script acquisition unit according to the run mode acquired by the parameter acquisition unit using the input parameter acquired by the parameter acquisition unit, and, when the run mode is a dry run mode, the script running unit skipping a process of changing configuration of the network among processes described in the script, and running the script in the production environment.

Advantageous Effect of the Invention

According to one aspect of the present invention, it makes it possible to prevent failures caused by failing in automated operations from occurring in operating a large-scale network.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 8 is a schematic diagram exemplarily outlining DNS registration processing.

FIG. 9 is a schematic diagram illustrating an exemplary pseudo code of the DNS registration processing.

FIG. 10 is a schematic diagram exemplarily outlining Virtual Machine migration processing.

DESCRIPTION OF EMBODIMENTS

Figure 1:
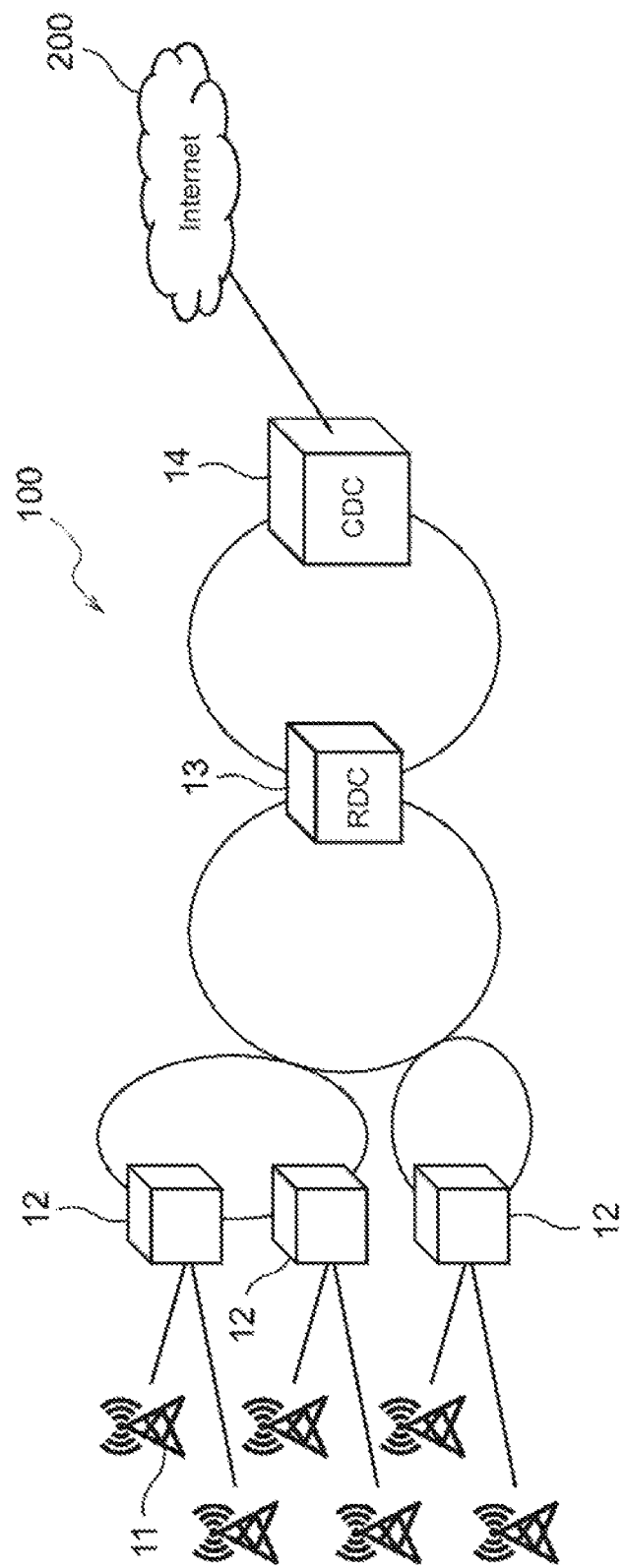
FIG. 1 is a conceptual diagram illustrating an exemplary network configuration of a mobile network including a network management apparatus according to the present embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a network management apparatus according to the present embodiment has a network management function that runs a script for automating operations that are related to operating a mobile network constituted on a virtualized infrastructure (hereinafter referred to as an "automation script"). Here, the automation script is a small-scale program for automatically performing operations for operating the network, each of which includes multiple processes (i.e., procedures).

More particularly, the network management apparatus acquires one or more input parameters that are required to run an automation script in a production environment of the automation script and a run mode of the automation script in the production environment, and runs the automation script according to the acquired run mode using the acquired input parameters.

When the run mode is a dry run mode (i.e., test mode), the network management apparatus skips the process of changing network configuration among the processes described in the automation script to run the automation script in the production environment. Also, the network management apparatus is able to verify the normality of the input parameters based on a result of running the automation script in the dry run mode.

FIG. 1 is a conceptual diagram illustrating an exemplary network configuration of a mobile network 100 including a network management apparatus according to the present embodiment.

In the mobile network 100 shown in FIG. 1, a mobile communicable terminal such as a smartphone and the Radio Access Network (RAN) communicate with each other wirelessly, and the transmitted information is relayed through the backhaul network (i.e., Mobile Backhaul: MBH) to the core network for processing. This allows the mobile communicable terminal to connect to the Internet 200 or connect to another company's network to make voice calls, or the like.

More particularly, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14.

The mobile network 100 according to the present embodiment is a virtualized network constructed on a virtualization infrastructure. The mobile network 100 realizes everything from the switching equipment of the backbone network to the radio access functions of the base stations by software on general-purpose servers.

The base station 11 is equipped with an antenna, a switchboard, a battery, and the like. The edge data center 12 is located near the base stations 11 and is connected to a plurality of base stations 11 via fiber-optic cables, or the like. The edge data center 12 realizes the RAN-related radio access functions.

The regional data center 13 is connected to a plurality of edge data centers 12. The regional data center 13 realizes, by software, the firewall/NAT (Network Address Translation), the CDN (Content Distribution Network), and various applications for edge computing.

The central data center 14 is connected to a plurality of regional data centers 13. The central data center 14 realizes core functions such as the EPC (Evolved Packet Core), the IMS (IP Multimedia Subsystem), or the like.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

Figure 2:
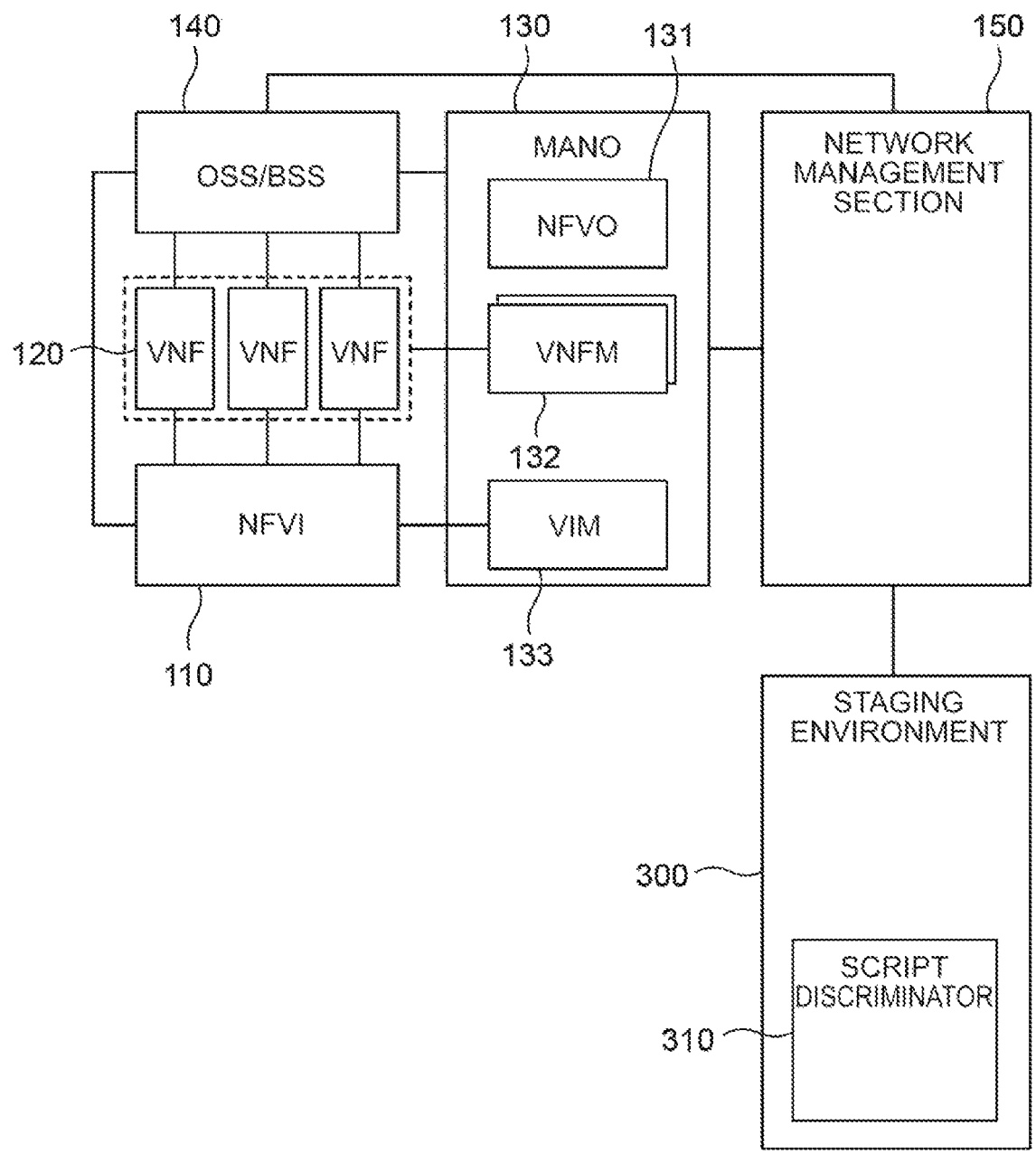
FIG. 2 is a block diagram illustrating an exemplary internal configuration of a network management system.

FIG. 2 is a block diagram illustrating an exemplary internal configuration of a network management system that constitutes the mobile network 100.

Each of constituent elements shown in FIG. 2 has a reference point. The lines connecting the constituent components shown in FIG. 2 indicate that connected constituent elements via the line can send and receive information from each other.

The NFVI (NFV Infrastructure) 110 is a network function virtualization infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Network Function Virtualization) 120. The virtualized resources are the virtualized infrastructure resources provided to the VNF 120.

In other words, the NFVI 110 is an infrastructure that enables flexible handling of hardware resources of physical servers (hereinafter also simply referred to as "servers"), such as computing, storage, and network functions, as virtualized hardware resources such as virtualized computing, virtualized storage, and virtualized network, which are virtualized by the virtualization layer such as the hypervisor.

A plurality of servers that constitute the NFVI 110 are grouped together and deployed in each of the data centers 12 to 14. The number, the placement positions, wiring, and the like, of the servers to be deployed in each of the data centers 12 to 14 are predetermined depending on the type of data center (i.e., accommodating station type). In each of the data centers 12 to 14, the deployed servers are connected by an internal network and are capable of sending and receiving information from each other. In addition, the data centers are connected to each other by a network, and the servers in different data centers are capable of sending and receiving information from each other via the network.

The VNF 120 corresponds to applications running on virtual machines (VMs) on the servers and implements the network functions by software. Although not specifically shown, each VNF 120 may be provided with a management function called an EM (Element Manager).

The NFVI 110 and the VNF 120 in FIG. 2 constitute the virtualized environment. In other words, the virtualized environment is constituted with three layers, in order from the lower layer: the hardware, the virtualization layer, and virtual machines.

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources of the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

The network management section 150 acquires an automation script, which has cleared the operation test in the staging environment 300 and is released to the production environment (i.e., execution environment), and also acquires the input parameters that are required for running the automation script in the production environment and the run mode of the automation script in the production environment. Then, the network management section 150 runs the automation script according to the acquired run mode using the acquired input parameters.

Here, the production environment corresponds to the production environment (i.e., operational environment) of the mobile network 100, while the staging environment 300 corresponds to a test environment for checking operations and defects of the system under the same conditions as the production environment. The staging environment 300 and the production environment differ in the scale and configuration of the environment, for example, in the number of servers and network devices.

After the automation script has been thoroughly tested in the staging environment 300, the automation script is released to the production environment and runs in the production environment. Here, the automation script is configured at run time to accept input parameters that are required for running in the production environment. The input parameters include values to be assigned to variables defined in the automation script and the run mode of the automation script. The run mode includes a dry run mode and a production run mode.

The automation script is capable of running in the dry run mode and in the production run mode.

In the dry run mode, among the processes described in the automation script, the process of changing network configuration is skipped, and remaining processes, such as checking the network status and configuration, are run. On the other hand, in the production run mode, all processes described in the automation script are run. It should be noted that, in the production run mode, among the processes described in the automation script, predetermined processes that have been already run in the dry run mode and do not need to be run again in the production run mode may be skipped.

The above network management section 150 serves as the network management apparatus according to the present embodiment.

It should be noted that, the network management section 150 is not limited to the case where the network management section 150 is an external function of the OSS/BSS 140 or the MANO 130 as shown in FIG. 2. The network management section 150 may be provided inside the OSS/BSS 140 or the MANO 130. In this case, the network management function of the network management section 150 is a part of functions of the OSS/BSS 140 or the MANO 130.

The script discriminator 310 acquires an automation script that is prior to being released to the production environment, and determines whether or not a source code of the acquired automation script includes a specific keyword related to the process of changing the network configuration. Subsequently, when the above specific keyword is determined to be included in the automation script, the script discriminator 310 discriminates, among processes described in the automation script, a process corresponding to a portion of the automation script that includes the above specific keyword as the process of changing network configuration (hereinafter also referred to as "network configuration change process"), and outputs the discrimination results.

It should be noted that the script discriminator 310 is not limited to the case where the script discriminator 310 is provided in the staging environment 300, as shown in FIG. 2. The script discriminator 310 may be provided in any other environment such as a development environment or a verification environment, as long as the environment is different from the production environment.

Figure 3:
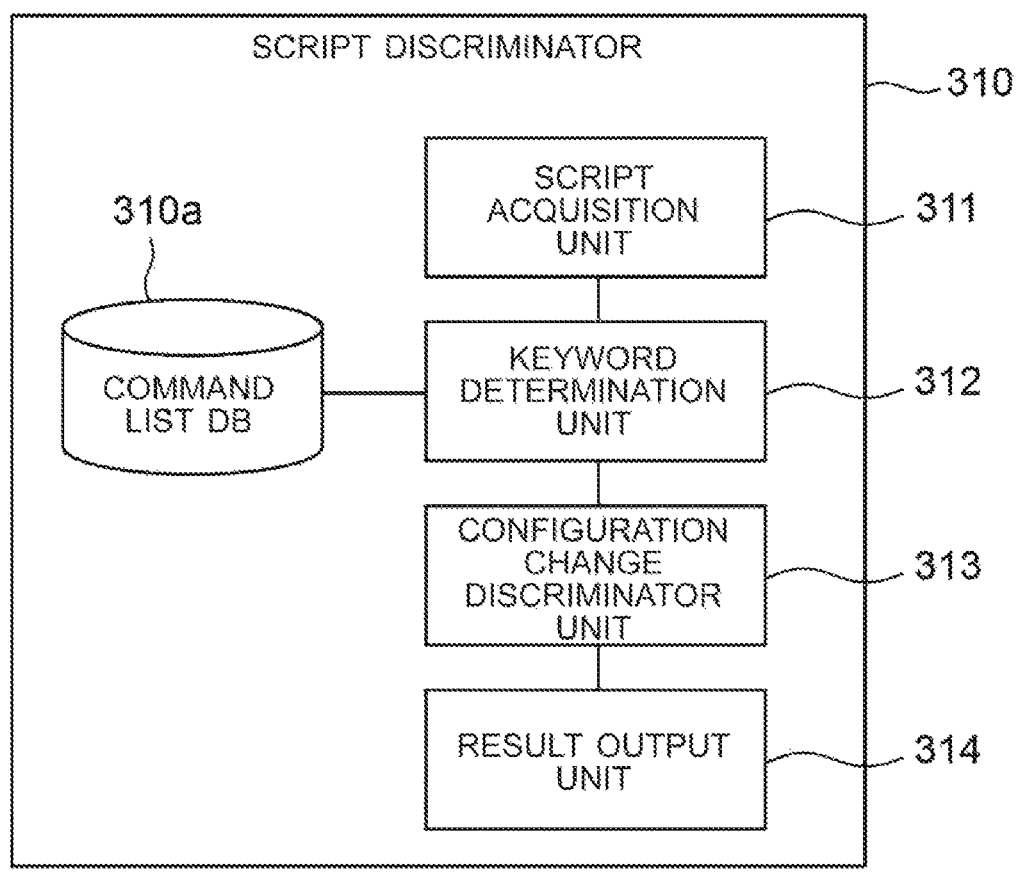
FIG. 3 is a block diagram illustrating an exemplary functional configuration of a script discriminator according to the present embodiment.

FIG. 3 is a block diagram illustrating an exemplary functional configuration of the script discriminator 310.

As shown in FIG. 3, the script discriminator 310 includes a script acquisition unit 311, a keyword determination unit 312, a configuration change discriminator unit 313, and a result output unit 314. In addition, the script discriminator 310 is equipped with a command list database (i.e., command list DB) 310a.

The script acquisition unit 311 acquires an automation script that is prior to being released to the production environment.

The keyword determination unit 312 refers to the command list database 310a and determines whether or not the source code of the automation script acquired by the script acquisition unit 311 includes a specific keyword related to the network configuration change process.

The command list database 310a serves as a keyword storage unit that stores specific keywords related to the network configuration change process. Here, the above specific keyword is a word or term that is included in a command to be issued to a network device or a request to be sent to an API (Application Programming Interface) of the network device when changing network configuration.

Figure 4:
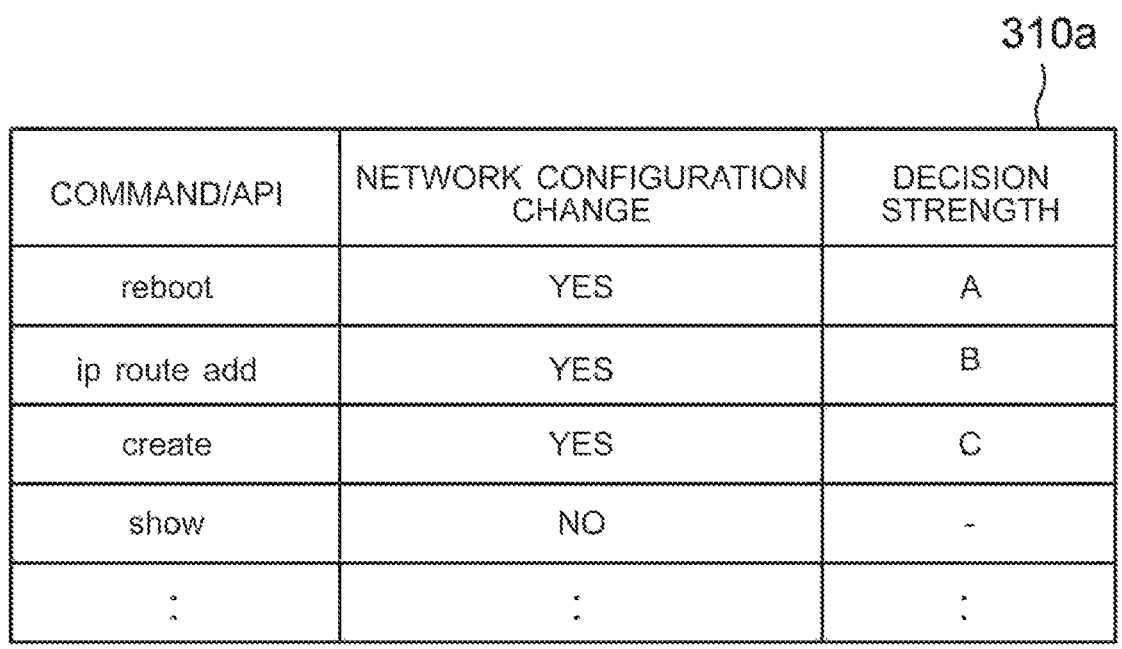
FIG. 4 is a schematic diagram illustrating an exemplary configuration of a command list database.

The command list database 310a may store, for example, as shown in FIG. 4, a list that maps a word in the command or the request to whether or not the network configuration is to be changed and a degree of certainty (i.e., decision strength) of the network configuration to be changed.

Here, the decision strength may include, for example, three levels: A, B, and C.

The decision strength A indicates that the degree of certainty of the decision of whether or not the network configuration is to be changed is "certain". For example, in an automation script, a "reboot" command is executed to reflect a configuration change. Therefore, it may be presumed that a portion of the automation script including the "reboot" command corresponds to the network configuration change process.

The decision strength B indicates that the degree of certainty of the decision of whether or not the network configuration is to be changed is "strong", which is relatively weaker than the decision strength A, indicating that whether or not the network configuration is to be changed may vary depending on the network environment.

For example, a command "ip route add" is a command to add an entry to a routing table, it means that the network configuration is usually changed when the command is executed. However, when the to-be-added entry has already been registered in the routing table, the network configuration will not be changed even when the above command is executed. In other words, whether or not a command concerned is related to changing network configuration is determined depending on the network environment and parameters following the command.

The decision strength C indicates that the degree of certainty of the decision of whether or not the network configuration is to be changed is "weak", which is weaker than the decision strength B, indicating that the decision is based on a weak presumption by a word itself. For example, a command "create" may or may not be a command related to the network configuration change depending on what is to be created or not.

Other words with the decision strength C include "set", "modify", "update", "delete", and the like.

Although FIG. 4 shows a certain example of commands, similarly, requests to the API may be stored, with each being mapped to information on whether or not the network configuration is to be changed and the decision strength.

In addition, FIG. 4 shows a certain example in which the command list database 310a stores keywords not related to the network configuration change process, such as a "show" command, alternatively, the command list database 310a may store only keywords related to the network configuration change process. In this case, the command list database 310a may eliminate information indicating whether or not the network configuration is to be changed.

The configuration change discriminator unit 313 discriminates the network configuration change process from the automation script based on the result of the determination by the keyword determination unit 312. More particularly, when the keyword determination unit 312 determines that the specific keyword is included in the source code of the automation script, the configuration change discriminator unit 313 discriminates, among all the processes described in the automation script, a process corresponding to a portion including the specific keyword as the network configuration change process.

The result output unit 314 outputs the results of the discrimination by the configuration change discriminator unit 313. More particularly, the result output unit 314 may output information on the network configuration change process discriminated by the configuration change discriminator unit 313.

The information on the network configuration change process output by the result output unit 314 may include the presence or absence of the network configuration change process, the contents of the network configuration change process (e.g., target command, source code, or the like), the degree of certainty (i.e., decision strength) to be the network configuration change process, or the like.

Furthermore, the result output unit 314 may edit and output automation scripts based on the results of the discrimination by the configuration change discriminator unit 313. For example, the result output unit 314 may edit and output automation scripts such that the automation script skips the network configuration change process discriminated by the configuration change discriminator unit 313. Yet furthermore, the result output unit 314 may also edit and output automation scripts such that the automation script prompts an operator, at the time of running the network configuration change process discriminated by the configuration change discriminator unit 313, to confirm whether or not to run the network configuration change process.

It should be noted that the configuration of the functional blocks of the script discriminator 310 shown in FIG. 3 is no more than exemplary only, and multiple functional blocks may constitute a single functional block, or any of the functional blocks may be divided into blocks that perform multiple functions, respectively.

Also, the multiple functions of the script discriminator 310 may each be the function of a separate component of the script discriminator system.

Figure 5:
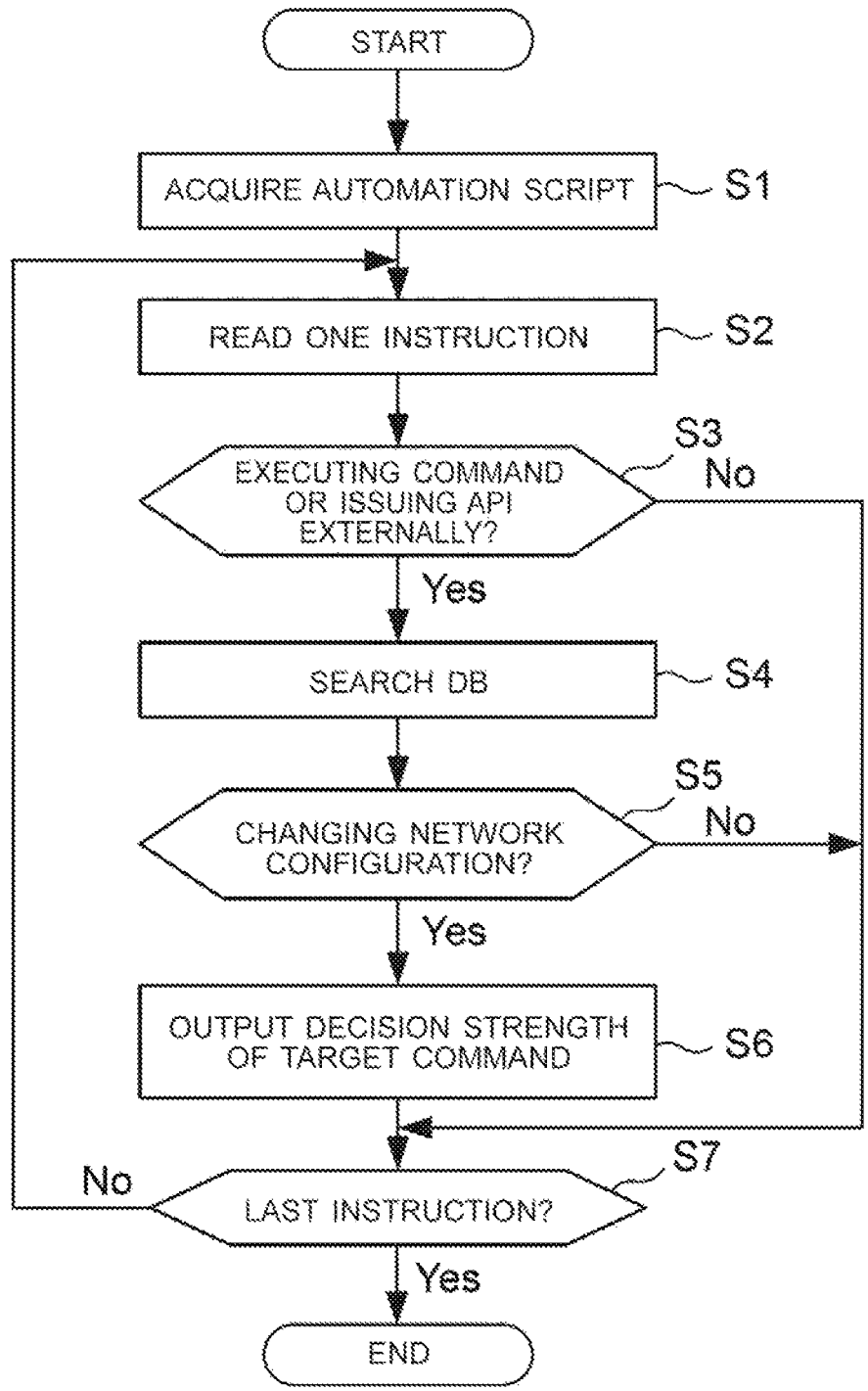
FIG. 5 is a flowchart illustrating an exemplary processing procedure performed by the script discriminator.

FIG. 5 is a flowchart illustrating an exemplary processing procedure performed by the script discriminator 310.

First, in step S1, the script acquisition unit 311 acquires an automation script, and the processing proceeds to step S2.

In step S2, the keyword determination unit 312 reads a single instruction in the source code of the automation script acquired in step S1, and the processing proceeds to step S3.

Subsequently, in step S3, the keyword determination unit 312 determines whether the source code read in step S2 is related to externally executing the command or externally issuing the API. When the keyword determination unit 312 determines that the source code is related to the command execution or the API issuance, the processing proceeds to step S4, and when the keyword determination unit 312 determines that the source code is related to either the command execution nor the API issuance, the processing proceeds to step S7.

In step S4, the keyword determination unit 312 searches the command list database 310a using the command or the request included in the source code read in step S2 as a key, and retrieves information on a corresponding record.

Subsequently, in step S5, the configuration change discriminator unit 313 determines, based on the search results retrieved by the keyword determination unit 312 in step S4, the presence or absence of the network configuration change. More particularly, the configuration change discriminator unit 313 determines that the network configuration is to be changed, when, as a result of the search in the command list database 310a, information on the record of network configuration change "Yes" is retrieved, and the decision strength is A or otherwise the network configuration may be determined to be changed based on the parameters or the like assigned to a command even if the decision strength is B or C.

When the configuration change discriminator unit 313 determines the network configuration to be changed, the processing proceeds to step S6, and when the configuration change discriminator unit 313 determines the network configuration not to be changed, the processing proceeds to step S7.

In step S6, the result output unit 314 outputs a target command and the decision strength thereof, which is determined to be a command related to the network configuration change process, and the processing proceeds to step S7. It should be noted that the output format by the result output unit 314 is not limited to the above and may be in any output format.

In step S7, the keyword discrimination unit 312 determines whether or not the instruction read in step S2 is a last instruction in the automation script, and when the instruction is determined not to be the last instruction, the processing returns to step S2, and when the instruction is determined to be the last instruction, the processing shown in FIG. 5 terminates.

Subsequent to step S7, a process may be added in which the results output unit 314 edits and outputs the automation script. In this case, the result output unit 314 may edit and output the automation script such that the automation script skips the network configuration change process, as described above, or the automation script prompts an operator to confirm whether or not to run the network configuration change process when running the network configuration change process.

Whether to skip or confirm to run the network configuration change process may be determined based on the decision strength. For example, when the decision strength is A or B, it is possible to skip the network configuration change process, while when the decision strength is C, it is possible to allow an operator to confirm whether or not to run the network configuration change process.

Figure 6:
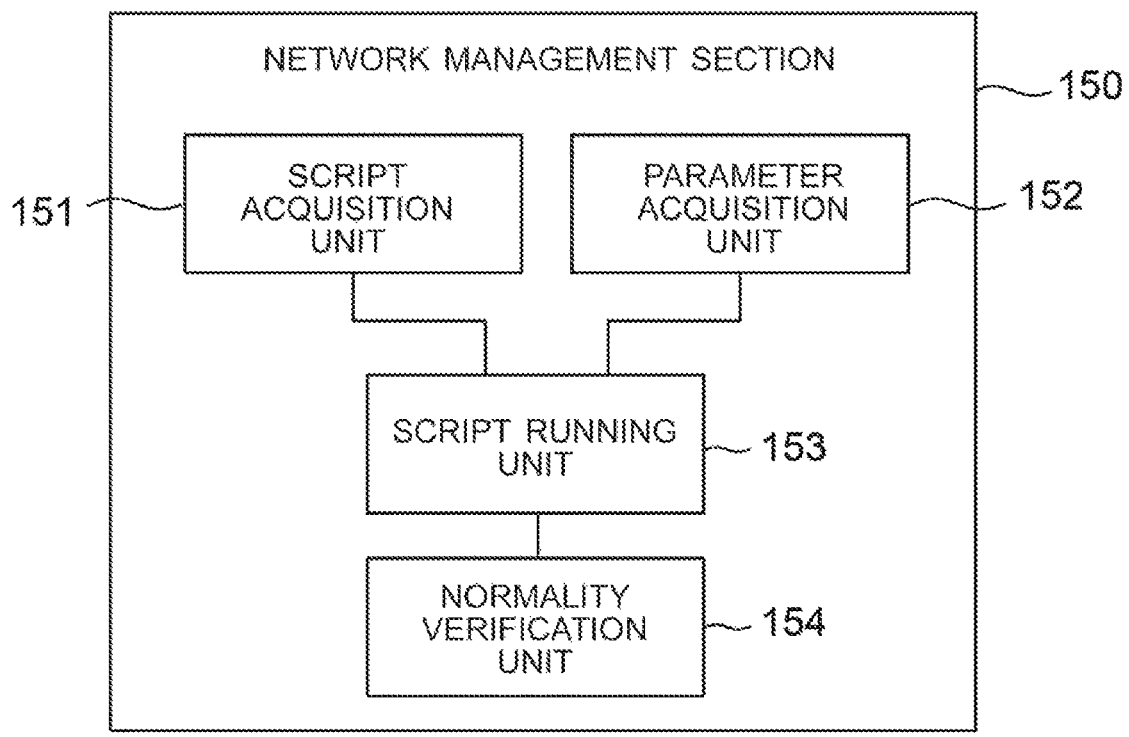
FIG. 6 is a block diagram illustrating an exemplary functional configuration of a network management section according to the present embodiment.

FIG. 6 is a block diagram illustrating an exemplary functional configuration of the network management section 150.

As shown in FIG. 6, the network management section 150 includes a script acquisition unit 151, a parameter acquisition unit 152, a script running unit 153, and a normality verification unit 154.

The script acquisition unit 151 acquires the automation script that has been released to the production environment.

The parameter acquisition unit 152 acquires the input parameters that are required to run the automation script acquired by the script acquisition unit 151, and the run mode of the automation script. The parameter acquisition unit 152 may be configured to be capable of accepting parameters to be input from an operator.

The script running 153 runs the automation script acquired by the script acquisition unit 151 according to the run mode acquired by the parameter acquisition unit 152 using the input parameters acquired by the parameter acquisition unit 152.

More particularly, when the run mode acquired by the parameter acquisition unit 152 is the dry run mode, the script running unit 153 skips the network configuration change process among the processes described in the automation script to run the automation script. On the other hand, when the run mode acquired by the parameter acquisition unit 152 is the production run mode, the script running unit 153 runs all the processes described in the automation script.

The normality verification unit 154 verifies normality of the input parameters acquired by the parameter acquisition unit 152 based on the results of running the automation script run in the dry run mode by the script running unit 153.

When the normality of the input parameters is verified by the normality verification unit 154, the script running unit 153 may automatically run the automation script in the production run mode.

Here, the production run mode subsequent to the dry run mode is a mode that runs the automation script including the network configuration change process described in the automation script, and may be a mode that runs all the processes of the automation script without skipping the process that has been run in the dry run mode among the processes described in the automation script. Alternatively, the production run mode subsequent to the dry run mode may be a mode that runs the automation script with skipping the process that has been run in the dry run mode among the processes described in the automation script.

It should be noted that the configuration of the functional blocks of the network management section 150 shown in FIG. 6 is no more than exemplary only, and multiple functional blocks may constitute a single functional block, or any of the functional blocks may be divided into blocks that perform multiple functions, respectively.

Also, the multiple functions of the network management section 150 may be divided into the external functions of the OSS/BSS 140 and the MANO 130 of the network management system shown in FIG. 2, the internal functions of the OSS/OSS 140, and the internal functions of the MANO 130, respectively.

Figure 7:
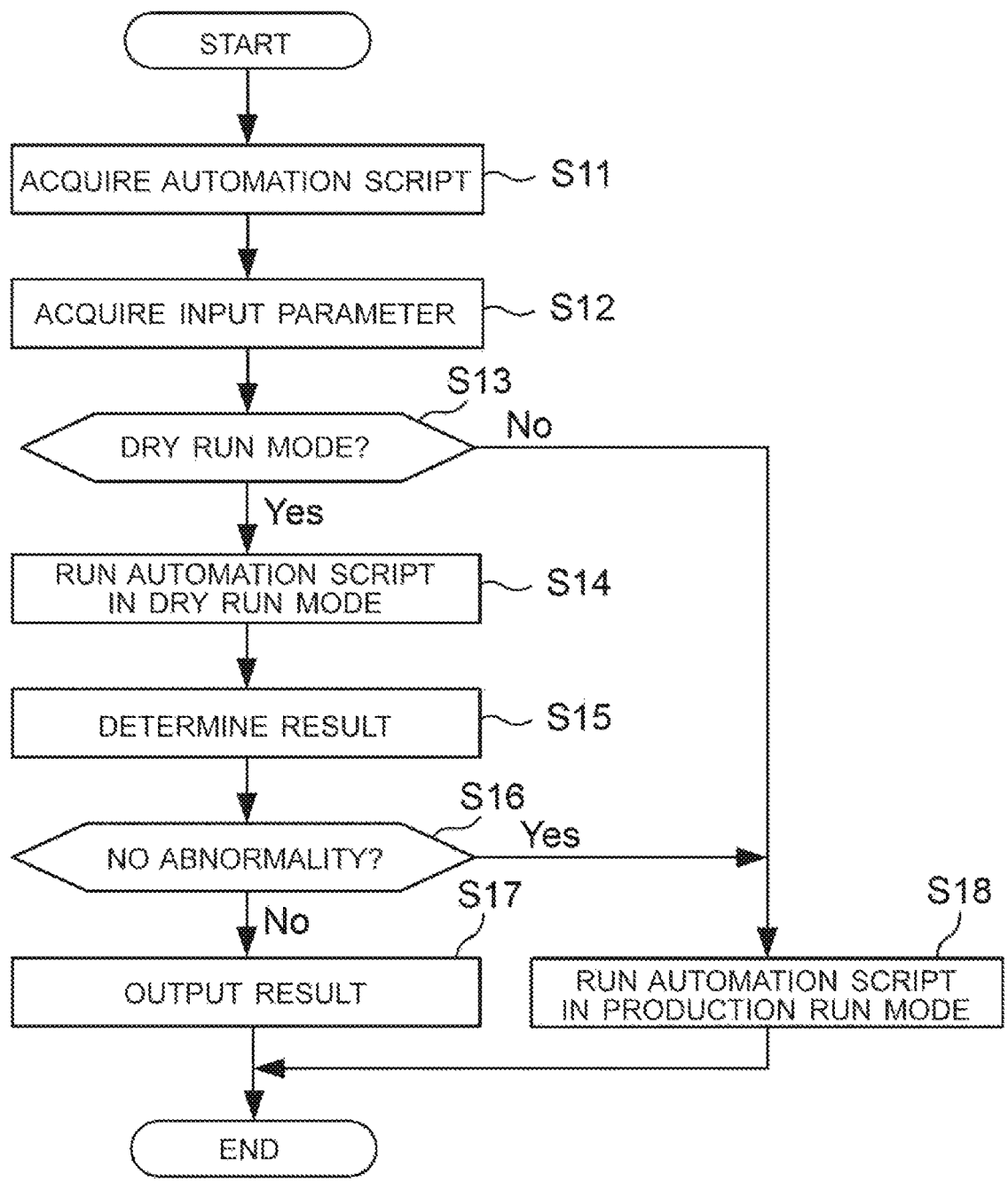
FIG. 7 is a flowchart illustrating an exemplary processing procedure performed by the network management section.

FIG. 7 is a flowchart illustrating an exemplary processing procedure performed by the network management section 150.

First, in step S11, the script acquisition unit 151 acquires a automation script released to the production environment, and the processing proceeds to step S12.

In step S12, the parameter acquisition unit 152 acquires input parameters that are required for running the automation script in the production environment and the run mode of the automation script in the production environment, and the processing proceeds to step S13.

In step S13, the script running unit 153 determines whether or not the run mode acquired in step S12 is the dry run mode, and when the run mode is determined to be the dry run mode, the processing proceeds to step S14, on the other hand, when the run mode is determined to be the production run mode, the processing proceeds to step S18.

In step S14, the script running unit 153 runs the automation script acquired in step S11 in the dry run mode. As a result, the script running unit 153 skips the network configuration change process among the processes described in the automation script, and runs the automation script.

In step S15, the normality verification unit 154 determines, based on the results of running the automation script run in the dry run mode, whether the input parameters input in step S12 are normal or not. Details of the normality verification processing will be described later.

In step S16, as verification results of normality of the input parameters by the normality verification unit 154, when the input parameters are determined to be abnormal, the processing proceeds to step S17, on the other hand, when the input parameters are determined to be normal, the processing proceeds to step S18.

In step S17, the normality verification unit 154 outputs the verification results of the normality of the input parameters, and the processing shown in FIG. 7 terminates.

In step S18, the script running unit 153 runs the automation script in the production run mode, and the processing shown in FIG. 7 terminates.

Hereinafter, specific examples of operations executed by an automation script will be described in detail.
(DNS Registration Processing)

A first example described here is DNS registration processing that registers an IP (Internet Protocol) address and a domain name to a DNS (Domain Name System) server.

A table 411 shown in FIG. 8 outlines respective processes included in the DNS registration processing, and FIG. 9 is a schematic diagram illustrating an exemplary source code (i.e., pseudo code) of the DNS registration processing. Reference signs a to d shown in FIG. 9 corresponds to pseudo code of steps a to d shown in FIG. 8, respectively.

Main input parameters for the DNS registration processing include an IP address to be registered (i.e., to-be-registered IP address), a domain name to be registered (i.e., to-be-registered domain name) and an IP address of the DNS server.

A process "a" is processing that logs in to a server to be registered ("target server") having a to-be-registered IP address ("target_ip") and checks domain settings ("domain") of the server concerned. At this time, it is determined whether or not the to-be-registered domain name ("target_domain") coincides with the domain settings ("domain"), and when the to-be-registered domain name does not coincide with the domain settings, the process "a" outputs an error.

It should be noted that the process "a" is based on an assumption that the to-be-registered server knows its own domain settings. The process "a" is run in the dry run mode and the production run mode, respectively.

A process "b" is forward and reverse DNS lookup processing to check the current DNS registration status.

In the forward DNS lookup, as shown in FIG. 9, the process "b" queries an IP address ("current_ip") corresponding to the to-be-registered domain name ("target_domain"), and when the corresponding IP address can be retrieved, the process "b" outputs an error, because the IP address corresponding to the to-be-registered domain name has already been registered.

It should be noted that, when the IP address retrieved at this time ("current_ip") coincides with the to-be-registered IP address ("target_ip"), the process "b" may notify, instead of outputting the error, that the to-be-registered IP address and to-be-registered domain name are correctly registered.

In the reverse DNS lookup, as shown in FIG. 9, the process "b" queries a domain name ("current_domain") corresponding to the to-be-registered IP address ("target_ip"), and when the corresponding domain name can be retrieved, the process "b" outputs an error, because the domain name corresponding to the to-be-registered IP address has already been registered.

It should be noted that, when the domain name retrieved at this time ("current_domain") coincides with the to-be-registered domain name ("target_domain"), the process "b" may notify, instead of outputting the error, that the to-be-registered IP address and to-be-registered domain name are correctly registered.

The process "b" is run in the dry run mode and the production run mode, respectively.

A process "c" is processing that registers a to-be-registered domain name and a to-be-registered IP address to the DNS server.

While the process "c" is skipped in the dry run mode, when the run mode is the production run mode, as shown in FIG. 9, the process "c" registers the to-be-registered domain name ("target_domain") and the to-be-registered IP address ("target_ip") to the DNS server.

A process "d" is, similarly to the process "b", the forward and reverse DNS lookup processing and is run in the dry run mode and the production run mode, respectively.

In the forward DNS lookup, as shown in FIG. 9, the process "d" queries an IP address ("registered_ip") corresponding to the to-be-registered domain name ("target_domain"), and when the retrieved IP address does not coincide with the to-be-registered IP address ("target_ip"), the process "d" outputs an error.

Similarly, in the reverse DNS lookup, as shown in FIG. 9, the process "d" queries a domain name ("registered_domain") corresponding to the to-be-registered IP address ("target_ip"), and when the retrieved domain name does not coincide with the to-be-registered domain name ("target_domain"), the process "d" outputs an error.

It should be noted that, as the process "c" is skipped in the dry run mode, the results of running the process "d" is assumed to be the same as the results of running the process "b". In other words, outputting an error is the correct result of running of the process "d" in the dry run mode.

The script acquisition unit 151 of the network management section 150 acquires an automation script that describes the processes "a" to "d" of the DNS registration processing, and the parameter acquisition unit 152 acquires a to-be-registered IP address, a to-be-registered domain name, and the IP address of the DNS server. In addition, the parameter acquisition unit 152 acquires the run mode of the automation script.

When the run mode is the dry run mode, the script running unit 153 skips the process "c" of the automation script, and runs the processes "a", "b", and "d". Subsequently, the normality verification unit 154 verifies the normality of the input parameters based on the results of running the automation script in the dry run mode.

For example, when an unused IP address is input incorrectly as a to-be-registered IP address among the input parameters, the login to the to-be-registered server (i.e., target server) fails in the process "a". Therefore, it makes it possible to detect errors in the input to-be-registered IP address.

Likewise, when a to-be-registered domain name is input incorrectly, an error occurs when checking the domain name in the process "a". Therefore, it makes it possible to detect errors in the input to-be-registered domain name.

In this way, based on the results of running the process "a", it makes it possible to verify the normality of to-be-registered IP addresses and to-be-registered domain names.

Furthermore, when a pair of IP address and domain name that have already been registered are input incorrectly as a pair of newly to-be-registered IP address and to-be-registered domain name, both the login to the to-be-registered server and the check of the to-be-registered domain name in the process "a" run normally. However, in the forward and reverse DNS lookups in the process "b", the obtainable result is that both the IP address and the domain name are already registered to the DNS server. Therefore, it makes it possible to detect errors in the to-be-registered IP address and the to-be-registered domain name.

Yet furthermore, when the IP address of the DNS server is input incorrectly, in the process "b", the forward and reverse DNS lookups will fail. Therefore, it makes it possible to detect errors in the IP address of the DNS server.

In this way, based on the results of running the process "b", it makes it possible to verify the normality of to-be-registered IP addresses, to-be-registered domain names, and an IP address of the DNS server.

When the normality of input parameters is verified by the normality verification unit 154, the script running unit 153 runs the automation script in the production run mode. At this time, the script running unit 153 runs all processes through "a" to "d" described in the automation script.

(VM Migration Processing)

A next example described here is VM migration processing that migrates virtual machines (VMs) on a physical server. The VM migration processing migrates virtual machines from a current physical server to another physical server for the purpose of physical server maintenance or in order to restore virtual machines that have been temporarily saved to a spare server to the original server.

A table 421 shown in FIG. 10 outlines respective processes included in the VM migration processing.

The main input parameters for the VM migration processing include a virtual machine ID, and a group of physical servers to which the destination physical server belongs. The virtual machine ID may include related parameters such as a virtual machine name, an application name, and a server name as attribute information. Although a certain case will be described here in which the physical server group is specified, alternatively, the destination physical server may be directly specified.

A process "A" is processing to check the existence of a virtual machine to be migrated as well as detailed information on the virtual machine (e.g., related parameters of the virtual machine, or the like). The process "A" is run in the dry run mode and the production run mode, respectively.

A process "B" is processing that deletes the virtual machine to be migrated from the current physical server. The process "B" is skipped in the dry run mode.

A process "C" checks unused resources of the destination physical server group. At this time, when the unused resources are insufficient, the process "C" outputs an error. The process "C" is run in the dry run mode and the production run mode, respectively.

A process "D" regenerates the virtual machine to be migrated on a predetermined physical server in the destination physical server group. The process "D" is skipped in the dry run mode.

A process "E" is processing to check the existence of the virtual machine to be migrated as well as the detailed information on the virtual machine, similarly to the process "A". The process "E" is run in the dry run mode and the production run mode, respectively.

The script acquisition unit 151 of the network management section 150 acquires the automation script that describes the processes "A" to "E" of the VM migration processing, and the parameter acquisition unit 152 acquires the virtual machine ID, and the destination physical server group. The parameter acquisition unit 152 also acquires the run mode of the automation script.

When the run mode is the dry run mode, the script running unit 153 skips the processes "B" and "D" in the automation script and runs processes "A", "C", and "E".

Subsequently, the normality verification unit 154 verifies the normality of the input parameters based on the results of running the automation script in the dry run mode.

For example, when the virtual machine ID is input incorrectly among the input parameters, the target virtual machine cannot be checked in the process "A", or the detailed information on the virtual machine is not the expected result, resulting in an error. Therefore, it makes it possible to detect errors in the input virtual machine ID.

Likewise, when the name of the destination physical server group is input incorrectly or when a physical server group with insufficient resources is specified, an error occurs in the process "C". Therefore, it makes it possible to detect errors in the input physical server group.

When the normality of input parameters is verified by the normality verification unit 154, the script running unit 153 runs the automation script in the production run mode. At this time, the script running unit 153 runs all the processes "A" to "E" of the automation script.

In the case of the VM migration processing described above, the process "A" may be skipped in the production run mode. This is because the process "A" has been already executed in the dry run mode and does not necessarily need to be run in the production run mode.

In this way, when running the automation script in the production run mode, it is possible to skip a certain process that has been run in the dry run mode among processes described in the automation script to run the automation script.

As explained above, the network management section 150, which serves as the network management apparatus according to the present embodiment, acquires an automation script, which automates operations related to operating the mobile network 100, input parameters, which are required to run the automation script in the production environment, and a run mode of the automation script. Subsequently, the network management section 150 runs the automation script according to the acquired run mode using the acquired input parameters. At this time, when the run mode is the dry run mode, the network management section 150 skips the network configuration change process among processes described in the automation script to run the automation script in the production environment.

The mobile network 100 is a large-scale network, which is constituted with thousands of devices or more. In operating those devices, by automating operations through automation scripts, it makes it possible to significantly reduce operating expenses.

Furthermore, according to the present embodiment, when the network management section 150 runs the automation script in the production environment, the network management section 150 is capable of executing the dry run, which skips a certain process such as changing the network configuration. Therefore, it makes it possible to reduce service interruptions and ultimately damages to the business due to operational failures caused by automation scripts. In addition, it makes it possible to safely verify risks, which cannot be guaranteed by simply testing in the staging environment, in the production environment.

Yet furthermore, by creating automation scripts based on the design concept of being able to be compatible with both the production run mode and the dry run mode, it makes it possible to apply the automation scripts to a wide range of operations regardless of the operation type.

For example, in the case of the DNS registration processing, the network configuration change process to be skipped in the dry run mode may be the process of registering a domain name and an IP address to the DNS server. In this case, even when the to-be-registered IP address or the to-be-registered domain name is input incorrectly as input parameters, it makes it possible to appropriately prevent wrong information from being registered to the DNS server.

Similarly, in the case of the VM migration processing to migrate virtual machines, the network configuration change process to be skipped in the dry run mode may be the process of at least one of deleting and creating virtual machines. In this case, even when a target virtual machine ID is input incorrectly or a physical server that creates a virtual machine is specified incorrectly as input parameters, it makes it possible to appropriately prevent the virtual machine from being deleted erroneously or being created on a wrong location.

In both cases, it makes it possible to control or suppress the impact on services caused by operational failures due to automation scripts.

Furthermore, the network management section 150 is capable of verifying the normality of input parameters based on the results of running automation scripts run in the dry run mode. This allows errors in the input parameters to be detected appropriately, including simple typing errors. In other words, it makes it possible to appropriately guarantee that input parameters that is input to run automation scripts in the production environment are correct.

Yet furthermore, when the normality of the input parameters is verified, the network management section 150 is able to automatically run the automation script in the production environment in the production run mode. In this way, the network management section 150 runs the automation script including a specific procedure to change the configuration of the network after the normality of the input parameters is verified. As a result, it makes it possible to reduce operational failures and unintended consequences caused by input parameter errors.

When the network management section 150 runs the automation script in the production run mode after the normality of the input parameters is verified, the network management section 150 may run all the processes described in the automation script, or alternatively, may skip a certain process that has been run in the dry run mode among processes described in the automation script to run the automation script.

Therefore, it makes it possible to automate operations in operating the network more appropriately. In addition, in the case of skipping, in the production run mode, a certain process that has been run in the dry run mode, it makes it possible to shorten the time required for operations by the amount of the skipped process.

As described above, according to the present embodiment, it makes it possible to execute the dry run, which skips the network configuration change process, when running automation scripts in the production environment. As a result, it makes possible to suppress failures caused by operational failures from occurring in operating the network.

The network management apparatus according to the present embodiment may be implemented in any of general-purpose servers that constitute the backhaul network, the core network, or the like, of the mobile network 100. Alternatively, the network management apparatus may be implemented in a dedicated server. The network management apparatus may also be implemented on a single or a plurality of computers.

Figure 11:
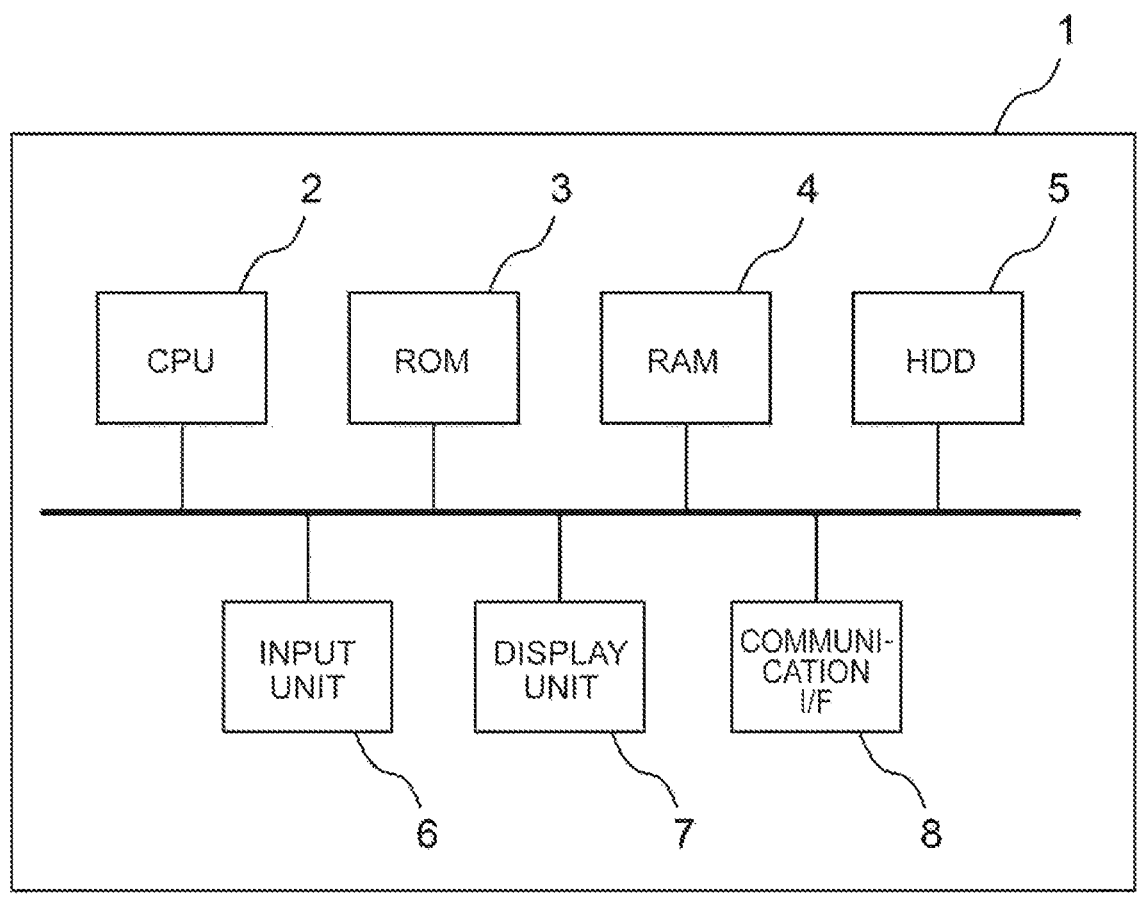
FIG. 11 is a block diagram illustrating an exemplary hardware configuration of the network management apparatus.

When the network management apparatus is implemented on a single computer, as shown in FIG. 11, the network management apparatus may include a CPU, a ROM, a RAM, an HDD, an input unit (e.g., keyboard, pointing device, or the like), a display unit (e.g., monitor, or the like), a communication I/F, and the like. In this case, at least a part of the functions of the constituent elements of the network management section 150 shown in FIG. 3 may be performed by executing the program by the above CPU. However, at least a part of the constituent elements of the network management section 150 shown in FIG. 3 may be operated as dedicated hardware. In this case, the dedicated hardware operates based on the control of the above CPU.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

11: Base Station; 12: Edge Data Center; 13: Regional Data Center; 14: Central Data Center; 100: Mobile Network; 110: NFVI; 120: VNF; 130: MANO; 131: NFVO; 132: VNFM; 133: VIM; 140: OSS/BSS; 150: Network Management Section; 151: Script Acquisition Unit; 152: Parameter Acquisition Unit; 153: Script Running Unit; 154: Normality Verification Unit; 310: Script Discriminator

What is claimed is:

1. A network management apparatus, comprising:
   at least one memory configured to store program code; and
   electronic circuitry including at least one processor, the at least one processor being configured to read and operate according to the program code to:
   acquire a script for automating an operation related to operating a network;
   acquire an input parameter that is required to run the script in a production environment of the script and a run mode in the production environment;
   run the script according to the run mode using the input parameter, wherein,
      when the run mode is a dry run mode, running the script comprises skipping a process of changing configuration of the network among processes described in the script, and running the script in the production environment, and wherein
      the process of changing configuration of the network is determined according to a corresponding decision strength included in the script.

2. The network management apparatus according to claim 1, wherein the at least one processor is further configured to read and operate according to the program code to:
   verify normality of the input parameter based on a result of running the script run in the dry run mode.

3. The network management apparatus according to claim 2, wherein,
   when the input parameter is verified to be normal, running the script further comprises running, in the production environment, the script a production run mode that runs the script including the process of changing configuration of the network described in the script.

4. The network management apparatus according to claim 3, wherein,
   when the input parameter is verified to be normal and the script is to be run in the production run mode in the production environment, running the script further comprises running all processes described in the script without skipping a process that has been run in the dry run mode among processes described in the script.

5. The network management apparatus according to claim 3, wherein,
   when the input parameter is verified to be normal and the script is to be run in the production run mode in the production environment, running the script further comprises skipping a predetermined process that has been run in the dry run mode among processes described in the script to run the script.

6. The network management apparatus according to claim 1, wherein,
   when the run mode is the dry run mode, running the script further comprises skipping a process of registering a domain name and an IP (Internet Protocol) address in a DNS (Domain Name System) server among processes described in the script.

7. The network management apparatus according to claim 1, wherein,
   when the run mode is the dry run mode, running the script further comprises skipping a process of at least one of deleting and creating a virtual machine constituting a virtualized environment of the network among processes described in the script.

8. A network management method performed by a network management apparatus, comprising steps of:
   acquiring a script for automating an operation related to operating a network;
   acquiring an input parameter that is required to run the script in a production environment of the script and a run mode in the production environment; and
   running the script according to the run mode using the input parameter wherein
      when the run mode is a dry run mode, running the script comprises skipping a process of changing configuration of the network among processes described in the script, and running the script in the production environment, and wherein
      the process of changing configuration of the network is determined according to a corresponding decision strength included in the script.

9. A network management system, comprising:
   at least one memory configured to store program code; and
   electronic circuitry including at least one processor, the at least one processor being configured to read and operate according to the program code to:
   acquire a script for automating an operation related to operating a network;
   acquire an input parameter that is required to run the script in a production environment of the script and a run mode in the production environment;
   run the script according to the run mode using run mode using the input parameter, wherein,
      when the run mode is a dry run mode, running the script comprises skipping a process of changing configuration of the network among processes described in the script, and running the script in the production environment, and wherein
      the process of changing configuration of the network is determined according to a corresponding decision strength included in the script.

* * * * *